June 2, 1964 C. W. MacMILLAN 3,135,052
WHEEL ALINEMENT APPARATUS
Filed Dec. 18, 1962
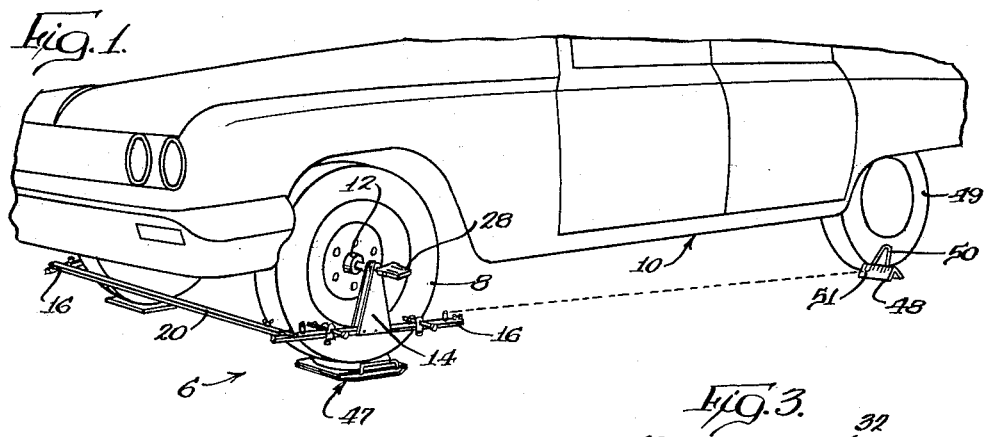
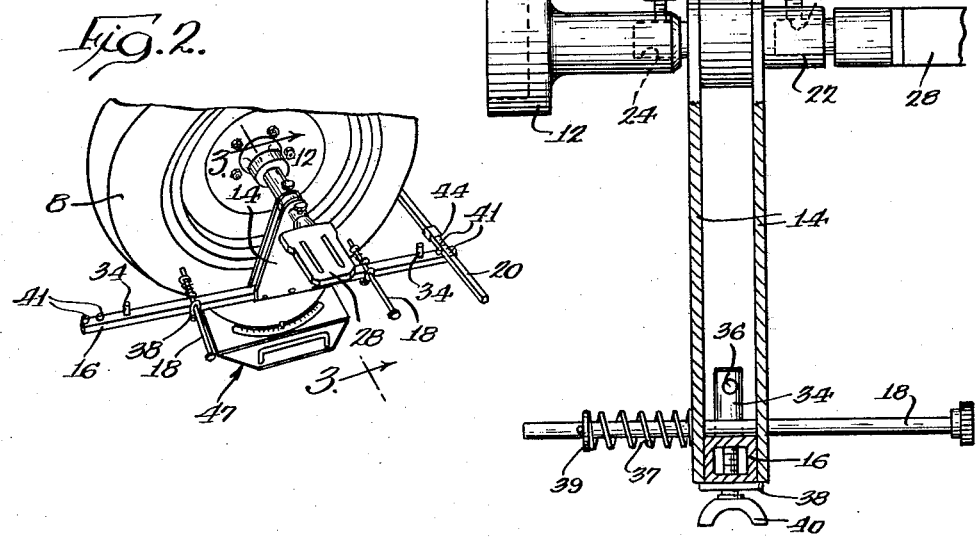
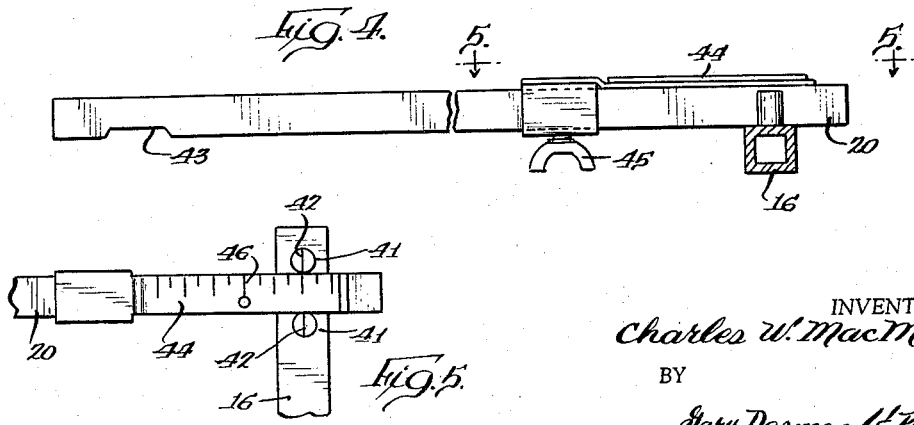
INVENTOR:
Charles W. MacMillan
BY
Gary, Desmond & Parker
Attys 3,135,052
WHEEL ALINEMENT APPARATUS
Charles W. MacMillan, Rock Island, Ill., assignor to Bear Manufacturing Company, Rock Island, Ill., a corporation of Delaware
Filed Dec. 18, 1962, Ser. No. 245,605
8 Claims. (Cl. 33—46)

This invention relates to apparatus for determining the toe of motor vehicle front wheels and the center position of vehicle steering systems.

As is well known to those skilled in the art, the front wheels of a motor vehicle are not exactly vertical relative to the ground, nor are they in parallel relation to each other. Certain angular relationships must be maintained for proper steering, such angular relationships being known as caster, camber, kingpin inclination, turning radius and toe. Various methods and apparatus have been proposed for measurement of such parameters, and reference may be had to my Patent 2,755,554, issued July 24, 1956, and to my copending application Serial No. 81,762, filed January 10, 1961, now Patent No. 3,071,863 for further discussion.

The object of the present invention is the provision of improved apparatus of economical construction which is conveniently used to determine both wheel toe and the center position of vehicle steering systems.

Another object of the invention is to provide apparatus of the character defined including improved support means readily associated with the two front wheels of an automotive vehicle and including a support bar mounted parallel to the respective wheel to serve simultaneously as reference surfaces for measurement of front wheel toe and sighting means for determining the center position of the vehicle steering system.

An additional object of the invention is the provision of improved apparatus as aforesaid including support bars respectively maintained parallel to each of the two wheels and a toe measuring rod cooperating with said bars to measure the distance between the two bars forwardly and rearwardly of the wheels, said bars and said rod having cooperable detent means facilitating accurate and reliable association of the rod with both bars from one side only of the vehicle, whereby the operator need not move from side-to-side of the vehicle to measure wheel toe.

Further objects of the invention include the provision of structural features enhancing the convenience of use and accuracy of apparatus for determining wheel toe and the center position of vehicle steering systems.

These and other objects and advantages of the invention will become apparent in the following detailed description.

Now, in order to acquaint those skilled in the art with the manner of making and using my improved apparatus, I shall describe, in connection with the accompanying drawing, a preferred embodiment of the apparatus and the preferred manner of making and using the same.

In the drawing:

FIGURE 1 is a perspective view of apparatus incorporating the principles of the invention arranged in operative position upon a motor vehicle;

FIGURE 2 is a slightly enlarged perspective view of one front wheel of the vehicle and the apparatus associated therewith, the view showing the measuring rod in position behind the wheel;

FIGURE 3 is an enlarged vertical cross-section taken substantially along line 3—3 of FIGURE 2;

FIGURE 4 is a fragmentary front view of the toe measuring rod; and

FIGURE 5 is a fragmentary plan view taken substantially along line 5—5 of FIGURE 4.

Referring now to the drawing, numeral 6 indicates one wheel mounted assembly incorporating the principles of the invention, and showing the same in position on the left front wheel 8 of a motor vehicle 10, in readiness for a toe and center position test. It will be understood that identical apparatus 6 will be arranged on the right front wheel of the vehicle during the test. The apparatus 6 includes a magnetic adapter 12, support means in the form of a pair of parallel hanger plates 14 depending from the adapter, a support or reference bar 16 affixed to the lower end of the hanger plates, and a pair of support rods 18 which are resiliently biased in one direction at right angles to the bar 16. A measuring rod 20 is adapted to be placed upon the reference bars 16 during a toe-in-test, as will be described in greater detail hereinafter.

The magnetic adapter 12 is arranged to enclose the end of the wheel hub and to be held thereon by magnetic attraction so that the axis of the adapter coincides with the axis of the wheel hub. Details of the magnetic adapter may be obtained from the disclosure of my above-identified copending application. For the present, it is only necessary to realize that the adapter maintains a position perpendicular to the wheel in substantial axial alinement with the wheel spindle.

The hanger plates 14, which are substantially triangular in shape, are secured at their apex or upper end to a shaft or pin 22, one end of which fits into an axial opening or recess 24 formed in the end of the adapter 12, and the other end of which is enlarged and has an axial opening or recess 26 for reception of a gauge 28, which may be used to check caster, camber and steering axis inclination, and which forms the subject matter of my said copending application. Set screws 30 and 32 are provided for maintaining the shaft 22 and gauge 28 respectively in coupled position as shown. The lower ends of the plates are affixed to the central portion of the bar 16 and support the same in generally horizontal position. The length of the bar 16, as best seen in FIGURE 2, is greater than the overall diameter of the wheel 8, so that the ends of the cross bar extend forwardly and rearwardly beyond the periphery of the wheel (i.e. tire) whereby the measuring rod 20 can rest on the end portions of the rod when in toe measuring position.

The support rods 18 are each mounted for longitudinal adjustment along the bar 16 by a U-shaped strap or bracket 38 through which the bar passes. Each bracket includes a locking means in the form of a wing fastener 40 threadably associated therewith, the thread end of the fastener being movable into abutment with the bottom surface of the bar. A helical spring 37 is compressively mounted upon the rod 18 between a washer 39, secured to the rod, and the side of the bracket 38 to urge the rod 18 into snug engagement with the side of the wheel 8. The support rods 18 are thus each adjustable longitudinally and laterally relative to the respective bar so that the ends of the rods may engage the tire 10 substantially equal distances to opposite sides of the support means 14 to hold the bar 16 in position parallel to the plane of the wheel.

Near each end of each reference bar 16 are a pair of guide pins 41, the pins of each pair being spaced apart a distance slightly more than the width of the measuring rod 20, to positionally receive the measuring rod when the latter is placed upon the bars. The pairs of guide pins 41 are spaced equal distances from the center of the respective bars, so that the pairs of pins on the opposite ends of the two bars are generally alined with one another transversely of the vehicle. Each guide pin 41 preferably has a straight line 42 inscribed on its upper surface, which line parallels the longitudinal axis of the respective bar 16.

A rectangular notch 43 is formed in the underside of the measuring rod 20 near one end, which notch is slightly longer than the width of the bars 16, and a longitudinally movable scale 44 is adjustably mounted on the opposite end of the measuring rod, on the upper side thereof. A wing fastener 45 is provided for locking the scale 44 in adjusted position on the measuring rod. Indicia, in the form of equally spaced lines 46, normal to the side edges of the measuring rod 20, are inscribed on the scale, the indicia being marked in equal increments to opposite sides of a zero mark in the mid-portion thereof.

A pair of spaced pins 34 are arranged to project from the top surface of each bar 16, each of said pins containing a sighting hole 36 the axis of which parallels the longitudinal axis of the respective bar.

A wheel target 48 is adapted to be placed for abutment with the forward edge of each rear wheel 49, each target having an integral V-shaped handle portion 50 for abutment with the outer edge of the respective wheel. Each target 48 has a plurality of equally spaced, vertical lines 51 which are used for obtaining an alinement reading from the sight pins 34 relative to the front wheel on the same side of the vehicle, as will be hereinafter explained. In using the apparatus of the invention, each of the front wheels is preferably, though not necessarily, positioned upon a turning radius gauge 47, designed to provide a rotatable table so that the wheel supported thereby may be swung from side-to-side into a generally straight ahead position for checking wheel toe and center position. Apparatus 6 is mounted on both front wheels of the vehicle, and the targets 48 are placed in position at the rear wheels, all as shown in FIGURE 1.

A sighting is made on each target 48 through the sighting holes 36 in the pins 34 on the bar 16 on the respective side of the vehicle. If the target is not visible the bar 16 is adjusted so that the target will be visible when viewed through the sighting holes. When such condition is realized, the bar 16 on each side of the vehicle is fixed in position by locking the support rods 18 in abutment against the wheel 8. The wheels 8 are then swung back and forth as need be until the target readings are the same on both sides of the vehicle when the front portions of the wheels are spread by pushing lightly outward on both wheels simultaneously.

The measuring rod 20 is then slid under the vehicle, from either side of the vehicle, rearwardly of the front wheels, the rod being manipulated by the operator from the scale end of the rod. The operator then lifts the rod to place the notched end thereof between the rearward pair of guide pins 41 on the far side of the vehicle and shifts the rod longitudinally to cause the notch 43 to aline and seatably engage with the respective bar 16. The operator then places the scale end of the bar between the rearward pair of pins on the bar 16 adjacent to him, whereby the measuring rod is operatively associated with the reference bars 16 without necessity for the operator going from side-to-side of the vehicle. The scale 44 is then adjusted so that the zero mark of the scale coincides with the indicator lines 42 on the adjacent guide pins 41, and the scale is locked in said position. The measuring rod 20 is then removed from the rearward ends of the reference bars (again from one side of the vehicle) and placed atop the bars (in the same manner) forwardly of the wheels 8. If the zero mark on the measuring rod scale 44 is outside the indicator lines 42 on the now adjacent guide pins 41, the front wheels have toe-in; if the zero mark alines with the indicator lines 42, the wheels have zero toe; and if the zero mark is inside the indicator line, the front wheels have toe-out. The scale 44 will show the exact amount of toe, which is then checked with vehicle manufacturers' specifications. Also, the operator will now check to see if the steering wheel in the driver compartment of the vehicle is in centered, straight ahead steering position. If necessary, to correct either or both of wheel toe and the centered position of the steering system, appropriate adjustments are made via the tie rod of the steering system. Such adjustments are readily effected by automotive mechanics, and other persons skilled in the art, and need not be discussed further herein. As will be obvious, the apparatus of the invention can be retained in position and used to assist in and secure the proper results of any correction procedure.

From the foregoing, it will be seen that the embodiment of the invention illustrated and described will satisfy all of the objectives set forth hereinbefore.

The foregoing description has been given in detail without thought of limitation since the inventive principles involved are capable of assuming other forms without departing from the spirit of the invention or the scope of the following claims:

I claim:

1. In apparatus for determining the toe of the front wheels of an automotive vehicle, adapter means fixed to each wheel coaxially thereof, support means depending from each adapter parallel to the respective wheel, a bar carried by each support parallel to the respective wheel, a pair of brackets mounted on each bar on opposite sides of the respective support, and a spring pressed rod mounted on each bracket at right angles to said bar and yieldingly biased against the wheel to retain said bar parallel to the respective wheel.

2. In apparatus for determining the toe of the front wheels of an automotive vehicle, adapter means removably fixed to each wheel coaxially thereof, support means depending from each adapter parallel to the respective wheel and movable in a plane about the axis thereof, a bar carried by each support means parallel to the respective wheel, a pair of brackets adjustably mounted on each bar on opposite sides of the respective support, a spring pressed rod mounted on each bracket at right angles to the respective bar and yieldably biased against the wheel tire to retain said bar parallel to the respective wheel, and locking means on said brackets for locking said brackets and said rods to said bar.

3. In apparatus for determining the toe of the front wheels of an automotive vehicle, adapter means removably fixed to each wheel coaxially thereof, support means depending from each adapter parallel to the respective wheel, a bar carried by each support means parallel to the respective wheel, each bar extending forwardly and rearwardly beyond the periphery of the respective wheel, transversely alined guide means adjacent both ends of the two bars, and a measuring rod for transverse placement atop the two bars forwardly and rearwardly of the front wheels, said measuring rod being received by said guide means and having detent means on its underside near one end for seatable engagement with one cross bar, whereby the measuring rod can be operably associated with both bars by manipulation from its opposite end.

4. In apparatus according to claim 3, a scale having indicia thereon movably mounted atop said measuring rod adjacent its said opposite end.

5. In apparatus according to claim 4, said guide means comprising a pair of spaced pins adjacent each end of each bar for reception therebetween of the measuring rod, at least one pin of each pair having a straight line inscribed on its upper surface parallel with the longitudinal center line of the respective bar and comprising an index mark for a measurement reading from said scale.

6. In apparatus according to claim 3, sighting means on each bar parallel with the longitudinal axis thereof, and a target adjacent each rear wheel of the vehicle bearing centering indicia visible through said sighting means.

7. In apparatus according to claim 6, said sighting means comprising a pair of spaced pins projecting upwardly from the bar, each pin having a sighting hole therethrough the axis of which is parallel with the longitudinal axis of the respective bar.

8. In apparatus for determining the toe of the front wheels of an automotive vehicle, adapter means removably fixed to each wheel coaxially thereof, support means depending from each adapter parallel to the respective wheel and movable in a plane about the axis thereof, a bar carried by each support means parallel to the respective wheel, a pair of brackets adjustably mounted for longitudinal movement on each bar to opposite sides of the respective support, a spring pressed rod slidably mounted on each bracket at right angles to the respective bar and yieldably biased against the wheel tire to retain said bar parallel to the respective wheel, locking means on said brackets for locking said brackets and said rods to said bar in adjusted position, each bar extending forwardly and rearwardly beyond the periphery of the respective wheel, a pair of spaced guide pins adjacent each end of each bar, the pairs of pins adjacent the respective ends of the two bars being alined with one another transversely of the vehicle, a measuring rod for transverse placement atop the two bars forwardly and rearwardly of the front wheels, said measuring rod being received between the pins of each transversely alined pair and having a recess on its underside near one end for seatable engagement with one of said bars, a scale plate adjustably mounted atop said measuring rod adjacent its opposite end for cooperation with the pins adjacent thereto, a pair of longitudinally spaced pins projecting upwardly from each bar and each having a sighting hole therethrough the axis of which is parallel with the longitudinal axis of the respective bar, and a target adjacent each rear wheel of the vehicle bearing centering indicia visible through the sighting pins on the bar on the same side of the vehicle.

References Cited in the file of this patent
UNITED STATES PATENTS

| | | |
|---|---|---|
| 1,449,289 | King | Mar. 20, 1923 |
| 1,829,133 | Frykman | Oct. 27, 1931 |
| 2,532,593 | Bender et al. | Dec. 5, 1950 |
| 2,616,186 | Shooter et al. | Nov. 4, 1952 |
| 2,972,189 | Holub | Feb. 21, 1961 |
| 3,091,862 | MacMillan | June 4, 1963 |